United States Patent [19]

Danilova et al.

[11] 4,308,035
[45] Dec. 29, 1981

[54] COMPOSITION FOR FABRICATING ABRASIVE TOOLS

[76] Inventors: Faina B. Danilova, ulitsa B.Uchitelskaya, 10, kv. 10, Moskovskaya oblast, poselok Rodniki; Vladimir N. Lvov, ulitsa Obrucheva, 5, Korpus 1, kv. 10, Moscow; Nikolai V. Pertsov, ulitsa Butlerova, 18, kv. 1, Moscow; Genya A. Storchak, ulitsa Scherbakovskaya, 16/18, kv. 240, Moscow; Vladimir G. Safronov, Kronshtadtsky bulvar, 43, korpus 3, kv. 283, Moscow; Viktor A. Lobachev, ulitsa Z.Kosmodemyanskoi 4, kv. 4, Moskovskaya oblast, stantsia Khimki; Nikolai S. Koshevoi, ulitsa Maiorovka, 3, kv. 41; Genrikh A. Mkrtchan, ulitsa Michurina, 19, kv. 41, both of Lvov, all of U.S.S.R.

[21] Appl. No.: 26,999

[22] Filed: Apr. 4, 1979

[51] Int. Cl.$^3$ ............................................. C09K 3/14
[52] U.S. Cl. ....................................................... 51/298
[58] Field of Search ........................................ 51/298

[56] References Cited

U.S. PATENT DOCUMENTS 3,385,684  5/1968  Voter ................................... 51/298
3,661,544  5/1972  Whitaker ............................. 51/298
4,042,346  8/1977  Sioui et al. ........................... 51/298

OTHER PUBLICATIONS

Hackh's Chemical Dictionary, McGraw-Hill Inc., Copyright 1969, p. 622.

*Primary Examiner*—Donald E. Czasa
*Assistant Examiner*—W. Thompson
*Attorney, Agent, or Firm*—Lilling & Greenspan

[57] ABSTRACT

According to the invention, the composition contains an abrasive material (12.5–37.5 vol.-%), a metallic filler (30–60 vol.-%), a mineral binder (5–30 vol.-%) and the balance is an organic binder.

The mineral binder is constituted by at least one substance from a group of salts whose melting temperature corresponds to the temperature range of polymerization of the organic binder.

4 Claims, No Drawings

COMPOSITION FOR FABRICATING ABRASIVE TOOLS

BACKGROUND OF THE INVENTION

1. Field of the Invention

The present invention relates to fabrication of abrasive tools and more particularly it relates to a composition for making the working portion of the tool based on, for example, diamond, cubic boron nitride and other superhard materials.

The invention will prove most useful in grinding the hard-to-work materials such as heat-resistant and hard alloys, cemented and nitrided steels.

2. Prior Knowledge

Currently known are various compositions for fabricating abrasive tools with organic, metallic and ceramic binders.

However, the tools made of such compositions are unable to efficiently machine heat-resistant alloys and steels.

For example, the tools with organic binders while ensuring a satisfactory standard of the machined surface are characterized by a considerable specific consumption of diamonds which leads to high costs for machining materials.

Also known in the prior art are the attempts to increase the durability of the tool with organic binders by using metallic fillers consisting of metals with high electrical conductivity and a nonoxidized surface. In the opinion of their authors such compounds allow the tools to be used for electrochemical grinding which increases the stability of the tool.

However, such fillers consist, as a rule, of costly materials, e.g. silver (see U.S. Pat. Nos. 3,433,730, 3,547,609, British Pat. No. 1,137,965, FRG Pat. No. 1544643) and copper plated with gold or platinum (see British Pat. No. 1,177,854 FRG Pat. No. 1752504).

The tools with metallic binders likewise fail to ensure efficient machining of the above-mentioned materials since they cannot produce the requisite quality of machined surface.

The tools with ceramic binders used nowadays provide for a satisfactory level of machining but have an essential disadvantage in the form of a low resistance to wear.

The most promising in this respect is a composition containing an abrasive material, a metallic filler and an organic binder. For imparting electrical conductivity, said composition contains additives which destroy oxide films on the particles of the metallic filler, e.g. colophony and activated carbon (see Author's Certificate Specification USSR No. 537798). The use of the tools made of this comparatively cheap composition and capable of being used for electrochemical grinding have decreased the consumption of superhard abrasive materials.

At the same time the specific consumption of these abrasive compounds remains considerable to the present day.

An object of the present invention lies in eliminating the aforesaid disadvantages.

BRIEF DESCRIPTION OF THE INVENTION

The main object of the present invention consists in providing a composition for fabricating abrasive tools which increases the strength characteristics of the tool thereby reducing the specific consumption of superhard abrasive materials when grinding hard-to-work materials.

Another important object of the present invention is providing a compound for fabricating abrasive tools which ensures destruction of oxide films on the metallic filler thereby improving the electric conductivity of the tool.

Another object of the invention is providing a compound for fabricating abrasive tools which ensures high quality of the machined surface.

Still another object of the invention is providing a compound for fabricating abrasive tools whose binder consists of comparatively inexpensive components.

A still further object of the present invention is providing a compound for fabricating highly efficient abrasive tools.

These and other objects of the invention are accomplished by providing a composition for fabricating abrasive tools comprising an abrasive, a metallic filler and an organic binder which, according to the invention, additionally contains a mineral binder in the form of at least one substance selected from a group of salts whose melting temperature corresponds to the temperature range of polymerization of the organic binder, said components being taken in the following proportions (vol. %):

| | |
|---|---|
| abrasive material | 12.5–37.5 |
| metallic filler | 30–60 |
| substance from a group of salts | 5–30 |
| organic binder | balance. |

Here and hereinafter the term "group of salts" shall be understood as a combination of the salts proper, their mixtures or eutectics.

Owing to the introduction into the compound of a mineral binder and the correspondence of its melting temperature to the temperature of polymerization of the organic binder, the process of fabrication of the tool is characterized by the simultaneous wetting of the abrasive material and metallic filler with an organic binder and the molten salt component. In the course of subsequent cooling this provides for the development of additional bonds between the abrasive and metallic particles which leads eventually to a higher strength tool.

In addition, the salt component destroys the oxide films on the metallic parts of the filler thereby leading to higher electrical conductivity of the tool.

The selection of the percentage of composition components is based on the following considerations. When the content of abrasive material is reduced below 12.5% this considerably decreases the cutting capacity of the tool, while increasing this percentage above 37.5% raises its cost unnecessarily. A reduction of the content of metallic filler below 30% will make the electric conductivity of the tool insufficient for practical purposes while an increase of this content above 60% will impair the self-sharpening capacity of the tool in operation. The introduction of more than 30% of salt components impairs the durability of the tool while a reduction of their content below 5% will not ensure any noticeable growth of the tool durability.

In order to reduce friction and increase the permissible grinding depth, it is practicable that the composition should contain, additionally, at least one antifriction material with the following proportion of components (vol.-%):

| | |
|---|---|
| abrasive material | 12.5–37.5 |
| metallic filler | 30–50 |
| salt component | 5–20 |
| antifriction material | 5–15 |
| organic binder | balance |

A reduction of the content of antifriction material below 5% does not ensure a noticeable decrease in friction while an increase of this content above 15% adversely affects the strength of the tool.

DETAILED DESCRIPTION OF THE INVENTION

The tools are fabricated from the above-described composition in the following manner.

The components of the composition taken in the above-specified proportion are mixed, placed into a press-mold, heated to the temperature of polymerization of the organic binder and molded at a pressure of 500–800 kgf/cm$^2$. In the course of heating the salts become melted and produce a fluxing effect on metal, destroying its oxide film.

The contacts developing between the particles of metal ensure satisfactory electrical conductivity of the tool. As the composition cools down, the mineral and organic binders harden simultaneously thus ensuring a high strength tool.

The mineral binder may be constituted by salts, their mixtures and eutectics with the required temperature of melting.

For example, when the organic binder is phenol formaldehyde resin whose temperature range of polymerization lies within 180° and 220° C., the mineral binder may be a mixture of copper and sodium chlorides or copper and tin chlorides whose melting temperature is 200° C. When the organic binder is constituted by polyimide whose polymerization temperature ranges from 280° to 330° C., the same purpose may be served by taking the salt components whose melting temperature lies within the above-specified range. This requirement can be met by, for example, tin diiodide or the eutectic of sodium, potassium and copper chlorides whose melting temperature is 300° C.

If the melting temperature of the mineral binder exceeds the upper limit of the polymerization temperature range of the organic binder, the components of the mineral binder will not melting because the composition for fabricating the tool is heated only to the polymerization temperature of the organic binder. The result is that the salt component will not produce a binding effect; moreover, it will increase brittleness of the tool.

If the melting temperature of the mineral binder goes beyond the lower limit of the polymerization temperature range of the organic binder, the salt component will melt down prematurely during the course of heating the composition and will flow into the clearances of the press mold. This will cause, first, a considerable increase of tool porosity and, consequently, a decrease of its strength characteristics and, second, will lead to glueing together of the press-mould parts with the films of crystallized salt. This will hamper considerably the disassembly of the press-mould.

For obtaining a homogeneous compound, the mineral binder is crushed before use and the mass thus produced is rubbed through a sieve. Before molding, the internal surface of the press-mold is coated with a graphite lubricant to prevent baking of the compound to the material of the press-mold.

The substance of the invention will become more apparent from the examples of its realization given below.

EXAMPLE 1

The composition (vol.-%):

| | |
|---|---|
| abrasive material (diamond) | 25 |
| metallic filler (copper) | 35 |
| organic binder (phenol formaldehyde resin) | 15 |
| mineral binder (a mixture of salts including 82 parts by weight of CuCl and 18 parts by weight of NaCl) | 25 | has been used in the above-described way for fabricating a cylindrical grinding wheel.

The molding temperature was 210° C. Electrical conductivity of the working portion of the fabricated tool is 3.7 m/ohm·mm$^2$ and hardness-97 HB. In electrochemical grinding of a heat-resistant molybdenum alloy with this grinding wheel the specific consumption of diamond is 3.5 mg/g which is substantially lower than in the tools made of the previously known compositions.

EXAMPLE 2

The composition (vol.-%):

| | |
|---|---|
| diamond | 12.5 |
| copper | 37.5 |
| phenol formaldehyde resin | 20 |
| a mixture of salts CuCl - NaCl (composition as in Example 1) | 30 | has been used for fabricating a cylindrical abrasive wheel by the above-described method.

Molding temperature was 210° C. Electrical conductivity of the fabricated tool is 4.3 m/ohm·mm$^2$ and hardness 95 HB.

The specific consumption of diamonds in machining a heat-resistant molybdenum alloy is 3.7 mg/g.

EXAMPLE 3

The composition (vol.-%):

| | |
|---|---|
| diamond | 25 |
| metallic filler (4 parts by weight of copper to 1 part by weight of tin) | 30 |
| phenol formaldehyde resin | 20 |
| a mixture of salts (15 parts by weight of CuCl and 85 parts by weight of SnCl$_2$) | 25 | has been used by the above-described method for fabricating a cupshaped abrasive wheel.

The molding temperature was 210° C. The abrasive wheel produced in this manner has been used for machining a hard alloy under the following cutting conditions: wheel speed 20 m/s, longitudinal feed 1.5 m/min. cross feed 0.1 mm/double stroke. Under these conditions the specific consumption of diamonds is 0.2 mg/g is 3–5 times lower than with the tools made from previously known compounds.

EXAMPLE 4

The composition (vol.-%):

| | |
|---|---|
| diamond | 37.5 |
| copper | 30 |
| phenol formaldehyde resin | 27.5 |
| a mixture of salts CuCl - SnCl$_2$ (same composition as in Example 3) | 5 | was used by the above method for fabricating a cylindrical abrasive wheel.

The moulding temperature has been 215° C. When said wheel was used for grinding nitrided steel the specific consumption of diamond was 4.3 mg/g.

EXAMPLE 5

The composition (vol.-%):

| | |
|---|---|
| abrasive material (diamond) | 25 |
| abrasive material (boron carbide) | 12.5 |
| metallic filler (copper) | 30 |
| organic binder (epoxy resin) | 15 |
| mineral binder (copper acetate) | 18.5 | was used by the above method for fabricating a finishing tool. The molding temperature was 100°-110° C. and pressure, 200 kgf/cm$^2$.

This tool has been used for finish-working articles made of hard alloys. The efficiency of the finishing process was 1.7 times higher than with the tools made of the previously known compounds.

EXAMPLE 6

The composition (vol.-%):

| | |
|---|---|
| diamond | 12.5 |
| copper | 60 |
| organic binder (polyimide) | 22.5 |
| mineral binder (tin diiodide) | 5 | was used by the above method for making a cup-type abrasive wheel.

The molding temperature was 300° C. Electrical conductivity of the fabricated tool was 5.5 m/ohm·mm$^2$. When a hard alloy was ground by the produced wheel under the conditions specified in Example 3 the specific consumption of diamond was 0.15 mg/g which is 4–5 times lower than with the tools made from the previously known compounds.

EXAMPLE 7

The composition (vol.-%):

| | |
|---|---|
| abrasive material (cubical boron nitride) | 25 |
| copper | 35 |
| phenol formaldehyde resin | 15 |
| a mixture of salts NaCl - CuCl (same composition as in Example 1) | 15 |
| antifriction material (hexagonal boron nitride) | 10 | was used by the above method for fabricating a cup-type abrasive wheel. The molding temperature has been 215° C. The fabricated tool was used for grinding high-speed steel under the following conditions: wheel speed 20 m/s, longitudinal feed 1 m/min, cross feed 0.06 mm/double stroke. The specific consumption of the cubic boron nitride was 1.5 mg/g.

EXAMPLE 8

The composition (vol.-%):

| | |
|---|---|
| cubical boron nitride | 25 |
| copper | 25 |
| phenol formaldehyde resin | 25 |
| eutectics of salts NaCl - CuCl | 10 |
| antifriction material (graphite) | 5 |
| antifriction material (hexagonal boron nitride) | 10 | was used by the above method for fabricating a cylindrical abrasive wheel. The tool molding temperature was 215° C. When said tool was used for grinding cemented steel, the machining efficiency was twice as high as with the tools made from the previously known compounds.

EXAMPLE 9

The composition (vol.-%):

| | |
|---|---|
| diamond | 25 |
| copper | 35 |
| polyimide | 15 |
| salt eutectics NaCl - CuCl | 20 |
| molybdenum disulphide | 5 | was used by the above method for fabricating a cylindrical abrasive wheel.

The moulding temperature was 300° C. When said tool was used for grinding cemented steel, the machining efficiency was three times as high as with the tools made from the previously known compounds and there have been no observed phase changes in the surface layer of the machined parts.

While specific examples of the invention have been disclosed above, it will be understood that various modifications and changes within the spirit and the scope of the invention may occur to those skilled in the art.

Other modifications of the invention also can be resorted to without departing from the function or the scope of the invention as hereinafter defined by the appended Claims.

What is claimed is:

1. In a composition for fabricating abrasive tools comprising an abrasive material selected from the group consisting of diamond, boron nitride, boron carbide and other hard materials; a metallic filler; and an organic binder selected from the group consisting of phenol formaldehyde resin and polyimide resin; the improvement which comprises including in said composition an appropriate mineral binder whose melting temperature must correspond to the range of polymerization temperatures of the selected organic binder; said mineral binder consisting of one or a combination of components selected from the group consisting of copper chloride, sodium chloride, tin chloride, tin diiodide, and copper acetate; the above composition having the following proportions (vol.-%):

| | |
|---|---|
| abrasive material | 12.5–37.5 |
| metallic filler | 30 to 60 |

| | |
|---|---|
| mineral binder | 5 to 30 |
| organic binder | balance. |

2. A composition as claimed in claim 1 including at least one antifriction material, and which has the following proportion of components (vol.-%):

| | |
|---|---|
| abrasive material | 12.5–37.5 |
| metallic filler | 30 to 50 |
| salt component(s) | 5 to 20 |
| antifriction material | 5–15 |
| organic binder | balance. |

3. A method for improving the wear resistance of an abrasive tool composition comprising an abrasive material selected from the group consisting of diamond, boron nitride, boron carbide and other hard materials; a metallic filler; and an organic binder selected from the group consisting of phenol formaldehyde resin and polyimide resin; comprising: incorporating in said composition an appropriate mineral binder whose melting temperature must correspond to the range of polymerization temperatures of the selected organic binder; said mineral binder consisting of one or a conbination of components selected from the group consisting of copper chloride, sodium chloride, tin chloride, tin diiodide, and copper acetate; the above composition having the following proportions (vol.-%):

| | |
|---|---|
| abrasive material | 12.5–5–37.5 |
| metallic filler | 30 to 60 |
| mineral binder | 5 to 30 |
| organic binder | balance; | heating the composition to the polymerization temperature of the organic binder and molding at elevated pressure.

4. The method of claim 9 additionally containing at least one antifriction material, the components of said composition appearing in the following volumetric proportions:

| | |
|---|---|
| abrasive material | 12.5–37.5% |
| metallic filler | 30 to 50% |
| salt component(s) | 5 to 20% |
| antifriction material | 5 to 15% |
| organic binder | balance. |

* * * * *